United States Patent

Onofusa et al.

[11] Patent Number: 5,358,986
[45] Date of Patent: Oct. 25, 1994

[54] COVER FOR ACCOMMODATING AIR BAG IN AIR BAG SYSTEM

[75] Inventors: Norio Onofusa, Yokohama; Toshiaki Yamazaki, Tokyo, both of Japan

[73] Assignee: Asahi Kasei Kogyo Kabushiki Kaisha, Japan

[21] Appl. No.: 799,832

[22] Filed: Nov. 27, 1991

[30] Foreign Application Priority Data

Nov. 29, 1990 [JP] Japan .................. 2-325391

[51] Int. Cl.$^5$ .............................. C08K 5/09
[52] U.S. Cl. .................. 524/284; 524/289; 524/505; 525/98
[58] Field of Search ........ 524/284, 289, 505; 525/98

[56] References Cited

U.S. PATENT DOCUMENTS

| | | | |
|---|---|---|---|
| 4,777,203 | 11/1988 | Kawamura et al. | 524/289 |
| 4,853,154 | 8/1989 | Icenogle et al. | 524/505 |
| 4,859,366 | 8/1989 | Djiauw et al. | 524/505 |
| 5,013,065 | 5/1991 | Kreuzer . | |
| 5,191,024 | 3/1993 | Shibata et al. | 525/98 |

FOREIGN PATENT DOCUMENTS

| | | |
|---|---|---|
| 2241665 | 12/1980 | United Kingdom . |
| 2228235A | 12/1989 | United Kingdom . |
| 2241665A | 12/1990 | United Kingdom . |

*Primary Examiner*—Edward Cain
*Attorney, Agent, or Firm*—Finnegan, Henderson, Farabow, Garrett & Dunner

[57] ABSTRACT

The present invention aims to provide a cover for accommodating an air bag, having a high opening reliability, adaptable to a wide range of temperatures, having a good durability and a suitable touch, and providing a high productivity and a lower cost, and reducing the weight of the air bag apparatus as a whole. To attain the above object, the cover of the present invention is injection molded from a thermoplastic elastomer comprised of the following components (a), (b), (c) and (d), and having a hardness of between 60 and 85 measured according to JIS K 6301 TypeA. (a) a hydrogenated styrene and conjugated diene block copolymer of between 30 parts by weight and 55 parts by weight and obtained by hydrogenating a block copolymer composed of at least two polymer blocks including styrene units as a main part thereof and at least one polymer block including conjugated diene units as a main part thereof, a content of the styrene in the copolymer being between 20% by weight of the copolymer being $10^5$ or more; (b) a plasticizer to be used for a rubber, at between 25 parts by weight and 50 parts by weight; (c) an olefin group resin, at between 15 parts by weight and 30 parts by weight; (d) an additive of 5 parts by weight or less; wherein (a)+(b)+(c)=100 parts by weight.

7 Claims, 4 Drawing Sheets

COVER FOR ACCOMMODATING AIR BAG IN AIR BAG SYSTEM

BACKGROUND OF THE INVENTION

1. Field of the Invention

This invention relates to a cover for accommodating an air bag in an air bag system designed to confine a passenger in a seat upon the occurrence of a collision of an object running at a high speed such as an automobile or the like (hereafter, high-speed running object), and to prevent damage to the passenger from a secondary collision with a steering wheel or an instrument panel of the automobile.

2. Description of the Related Art

An air bag system is generally comprised of a sensor apparatus for sensing a collision of the high-speed running object and an air bag apparatus comprising an air bag, an inflator for generating a gas for expanding the air bag, a cover for accommodating the air bag and the inflator fixed thereto, a retainer for retaining the inflator and the cover in the body of the high-speed running object, and arranged at a position opposite to that of a passenger in the high-speed running object. Accordingly, when a collision occurs, a gas is instantaneously generated by the inflator, to thus fill the air bag connected to the inflator and folded up in a space formed between the inflator, the retainer and the cover, and the cover is opened by a pressure of the gas fed into the air bag, whereby the passenger is confined in a seat because the air bag is expelled from the cover and is instantaneously expanded toward a front side of the passenger, and thus injury to the passenger by a collision with a steering wheel or an instrument panel is prevented.

Accordingly, a cover used in the air bag apparatus must easily allow an instantaneous expansion of the air bag without a scattering of broken pieces of the cover, which may injure the passenger, when the collision occurs and the inflator is operated.

Various type of covers for the air bag apparatus are proposed in known references, e.g., Japanese Unexamined Patent Publications (Kokai) No. 50-127336, No. 55-110643, No. 52-116537, No. 1-202550, or the like.

Namely, the Japanese Unexamined Patent Publications (Kokai) No. 50-127336 and No. 55-110643 disclose a cover made of an elastic material such as a urethane resin and having a structure in which a reinforcing material such as a fiber net, a metal wire net or the like is embedded in all portions other than a portion of the cover to be broken open. Further, a metal plate may be used as the reinforcing material in this type of the cover. Namely, the resin used in the above cover is essentially fragile, and thus it is necessary to embed the reinforcing material in the resin to thereby prevent a scattering of the broken pieces. This structure is disadvantageous in that much time is required to arrange the reinforcing material in the resin when manufacturing the cover, and it is difficult to precisely embed the reinforcing material at a predetermined position in the cover. Further, when the urethane requiring reaction injection molding is used as the resin, much time is needed for a sufficient progress of the reaction in a mold, and thus this type of cover has the disadvantages of a slower production speed and lower production yield. The above disadvantages are fatal from the viewpoint of the automobile industry, because the production of automobiles in Japan has reached around $10^7$ cars per year.

Japanese Unexamined Patent Publication (Kokai) No. 52-116537 discloses a cover made of a thermoplastic elastomer having a brittle temperature of $-50°$ C. or lower and a bending stiffness of between 1,000 kg/cm$^2$ and 3,000 kg/cm$^2$, and a portion thereof to be broken having a fragile structure. Since this type of cover has no reinforcing material, incorporated therein, the productivity is improved, but the bending stiffness of this thermoplastic elastomer is high, i.e., between 1,000 kg/cm$^2$ and 3,000 kg/cm$^2$, and accordingly, an inflator having a bigger volume must be used to break open the cover, due to the high bending stiffness thereof. Further, the obtained cover has a high hardness, due to the use of the thermoplastic elastomer having the high bending stiffness, and accordingly, this cover cannot provide a suitably soft touch when coming into contact with the passenger, and provides little of the psychological serenity of the driver, etc., essential to safe driving. Further, when the high-speed running object further collides with another body, due to a skidding thereof or the like after the high-speed running object is subjected to a first collision and the air bag is expanded, the passenger could be injured by hard broken edges of the cover opened by the first collision, and accordingly, this cover is not preferable for practical use.

Japanese Unexamined Patent Publication (Kokai) No. 1-202550 discloses a cover obtained by an integral molding of a surface layer of a soft resin having a hardness according to JIS K 6301 TypeA of between 30 and 70, and a core layer of a hard resin having an elasticity and having slits to be further provided in the core layer. Although this cover can preferably provide a suitably soft touch against the passenger, nevertheless, since it is necessary to intermittently mold two layers i.e., the surface layer and the core layer to make this cover, this cover has a disadvantage in that a complicated and expensive injection machine having two injection mechanisms must be used.

U.S. Pat. No. 4,895,389 discloses a rupturable cover including two door sections having a generally S-shaped hinge. This cover, however, is formed from e.g., Du Pont's "Hytrel" copolyether ester elastomer, and accordingly, the hardness of this cover is high and there is a possibility that a passenger will be injured by broken pieces of this cover.

U.S. Pat. No. 5,013,065 published on May 7, 1991, discloses an air bag having a cover consisting of a one-piece injection molding of a thermoplastic elastomer, but the thermoplastic elastomer used in this cover has a thermal stability of from $-40°$ C. to $85°$ C., and accordingly, this cover cannot be used for an air bag apparatus in a high-speed running object in which the temperature can reach around $90°$ C.

The following six requirements must be satisfied by a cover of an air bag apparatus. First, the reliability of the opening of the air bag. Namely, when the air bag apparatus is operated, the cover can be opened without scattering broken pieces of the cover, which may injure the passenger, and allows an instantaneous expelling of the air bag. Further, preferably the passenger is not injured by already broken portions of the cover when the high-speed running object further collides with another body due to a skidding thereof or the like after the high-speed running object is subjected to a first collision and the air bag is expanded.

Second, the cover must be able to be operated In a broad range of temperatures. Namely, a temperature of the cover can be raised or lowered between $-40°$ C.

and +90° C., depending on an area, season or circumstance in which a car is used. Accordingly, the cover must not become brittle and lose the reliability of an expansion thereof at a lower temperature, or become too soft and easily deformed at a higher temperature.

Third, the cover must have a good resistance to heat and light. Namely, the cover may be arranged at a position irradiated by direct sunshine passing through a front glass of the car in which the air bag system is used, and may be used for five years, or even ten years or more, and accordingly, the cover must not age during the above long use, and thus lose the reliability of the opening thereof.

Fourth, a process of manufacturing the cover must have a high productivity and a lower cost. This requirement is especially important with regard to an air bag apparatus used in cars made by mass production.

Fifth, the cover must have a good touch. Namely, preferably the cover applies a suitably soft touch when the passenger is in contact with the cover, and thus provides a psychological serenity important to safe-driving.

Sixth, the cover must have as light a weight and as compact a size as possible. Namely, in view of fuel costs, a space for accommodating the air bag, and other factors, the cover itself, and the air bag apparatus as a whole, must have a light weight and compact size.

SUMMARY OF THE INVENTION

The object of the present invention is to provide a cover for accommodating an air bag, having a high opening reliability, adaptable to a wide range of temperature, having a good durability and a suitable touch, and providing a high productivity and a lower cost, and reducing the weight of the air bag apparatus as a whole.

A cover for accommodating an air bag in an air bag system in accordance with the present invention is a molded body obtained by injection molding a thermoplastic elastomer comprised of the following components (a), (b), (c) and (d) and having a hardness of between 60 and 85 measured according to JIS K 6301 TypeA, and having a recess for accommodating the air bag and a portion having a fragile structure to be broken when the air bag is expanded:

(a) a hydrogenated styrene and conjugated diene block copolymer of between 30 parts by weight and 55 parts by weight and obtained by hydrogenating a block copolymer composed of at least two polymer blocks including styrene units as a main part thereof, and at least one polymer block including conjugated diene units as a main part thereof, a content of the styrene in the copolymer being between 20% by weight and 40% by weight and an number-average molecular weight of the copolymer being $10^5$ or more;

(b) a plasticizer to be used for a rubber and of between 25 parts by weight and 50 parts by weight;

(c) an olefin group resin between 15 parts by weight and 30 parts by weight;

(d) an additive of 5 parts by weight or less wherein (a)+(b)+(c)=100 parts by weight.

Preferably, a butadiene is used as the conjugated diene, a paraffin group oil is used as the plasticizer, and a polypropylene is used as the olefin group resin.

An antioxidant, a light stabilizer and/or a heat stabilizer may be used as the additive.

Preferably, the fragile structure is formed by providing at least an elongated recess on a portion of the cover, more preferably, the elongated recess is a V-shaped groove.

Also, preferably a surface of the cover is covered with layer hardened by a light and/or heat.

BRIEF DESCRIPTION OF THE DRAWINGS

FIG. 10 is a view illustrating an indicator used in a hardness test according to JIS K 6301 TypeA, wherein

DESCRIPTION OF THE PREFERRED EMBODIMENTS

The present invention will be described hereinafter, in connection with the accompanying drawings showing embodiments of the present invention.

An example of a cover of an air bag apparatus used for a driver's seat in accordance with the present invention is shown in FIGS. 1 to 4.

Figure 2:
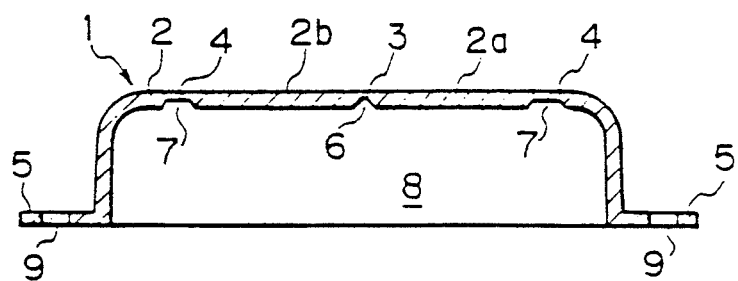
FIG. 2 is a cross sectional view taken along the line II—II of FIG. 1.
Figure 3:
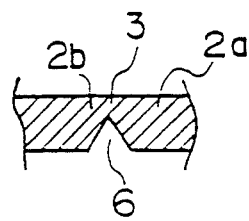
FIG. 3 is an enlarged cross sectional view of a V-shaped groove of FIG. 2.
Figure 4:
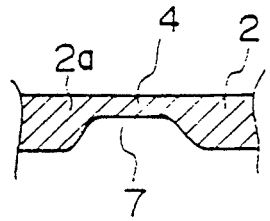
FIG. 4 is an enlarged cross sectional view of a U-shaped groove of FIG. 3.

The cover 1 has a flange 5 at a circumferential edge thereof and can be fixed to a retainer (not shown) by inserting bolts through holes 9 therein. The cover 1 has a box-like shape with one side open, and an air bag (not shown) can be accommodated in a recess 8 formed in an inside of the cover 1. A portion 3 having a fragile structure to be broken is arranged in the shape of a letter H in an inside of the top portion 2 of the cover 1, as shown by broken lines in FIG. 1, and two hinge portions 4 are arranged at two side portions of the inside of the top portion 2 of the cover 1, as shown by a chain dot line 4 in FIG. 1. The portion to be broken is formed by providing a V-shaped groove 6, as shown in FIGS. 2 and 3, and the hinge portions 4 are formed by providing a U-shaped groove 7, as shown in FIGS. 2 and 4. When the air bag is expanded, the cover is broken at the portion 3 and parts 2a and 2b are turned about the hinge portion 4, respectively, to form an opening from which the air bag can be expanded.

The dimensions of the cover are as follows.

A length of a portion corresponding to two vertical portions of the letter H is 12 cm; a length of a portion corresponding to a horizontal portion of the letter H 15 cm; a thickness of the cover in the portion to be broken is 1 mm; a thickness of the cover in the hinge portion is 2.5 mm; and a thickness of the other portion of the cover is 5 mm.

Figure 5:
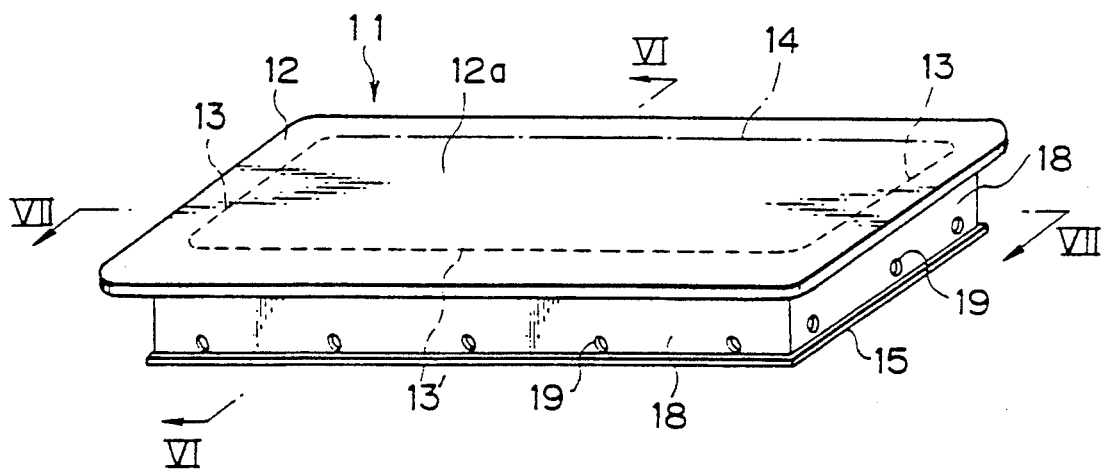
FIG. 5 is a perspective view of an example of a cover of an air bag apparatus used for a navigator's seat, in accordance with the present invention.
Figure 6:
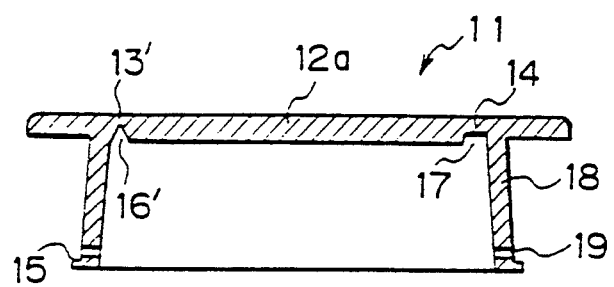
FIG. 6 is an enlarged cross sectional view taken along the line VI—VI of FIG. 5.
Figure 7:
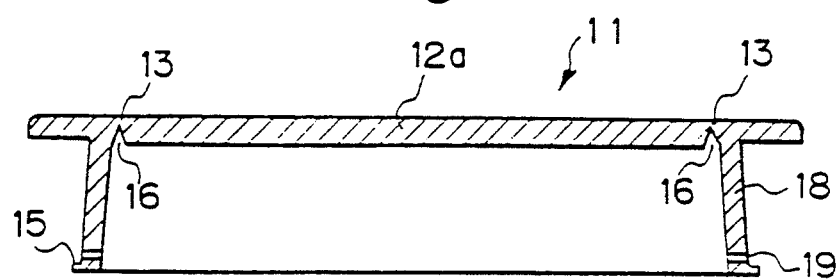
FIG. 7 is an enlarged cross sectional view taken along the line VII—VII of FIG. 5.

An example of a cover of an air bag apparatus used in a navigator's seat in accordance with the present invention is shown in FIG. 5 to 7.

The cover 11 is composed of four side walls 18 forming four side portions of the cover 11 and a top plate 12 having edges extending from the side walls 18. The side walls 18 also have a portion 15 extending laterally from a lower end thereof. The cover can be fixed to a retainer (not shown) by inserting bolts through holes 15 provided in the side walls 18, and an air bag (not shown) can be accommodated in a recess formed by the top plate 12 and the four side walls 18.

Portions 13 and 13' having a fragile structure to be broken are arranged in an inside of the top plate 12 of the cover 11 as shown in FIGS. 5 to 7, and a hinge portion 14 is arranged at a side portion of the inside of the top plate 12 of the cover 11, as shown in FIGS. 5 and 6. The portion to be broken is formed as V-shaped groove 16, 16' and the hinge portion 14 is formed as U-shaped groove 17, as in the example shown in FIGS. 1 to 4. When the air bag is expanded, the cover is broken at the portion 13 and 13' and a part 12a is turned about the hinge portion 14 to form an opening from which the air bag can be expanded.

The dimensions of the cover are as follows.

The top plate 12 has a length in a lengthwise direction of 34 cm, a length in a lateral direction of 14 cm and a thickness of around 5 mm; two of the side wall 18 have a width of around 28 cm, a height of around 6.8 cm, and a thickness of around 5 mm, and the other two side walls 18 have a width of around 10 cm, a height of around 6.8 cm, and a thickness of around 5 mm. A thickness of the portion 13 is around 0.6 mm at a position near to a center of the line indicated by a broken line 13', and 0.8 mm the other portions, and a thickness of the hinge portion 14 is 2.5 mm.

Figure 8:
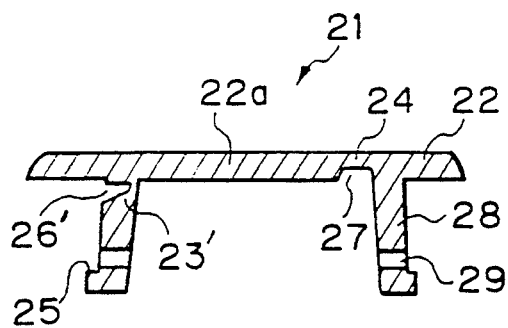
FIG. 8 is an enlarged cross sectional view, similar to FIG. 6, of another example of a cover of an air bag apparatus used for the navigator's seat.
Figure 9:
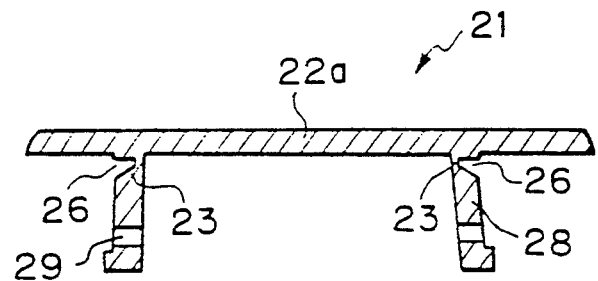
FIG. 9 is an enlarged cross sectional view, similar to FIG. 7, of the cover of FIG. 8.

Another example of a cover of an air bag apparatus used in a navigator's seat in accordance with the present invention is shown in FIGS. 8 and 9.

As shown in FIGS. 8 and 9, a hinged portion 24 of a cover 21 is arranged in an inside of the top plate 22, as in the example shown in FIGS. 6 to 8, but the portions 23 and 23' to be broken are arranged on the three side walls 28. Accordingly, when the air bag is expanded, the portions 23 and 23' in the side walls 28 are broken and a part 22a is turned about the hinged portion 24.

Note, although the V-shaped groove and the U-shaped groove are continuous in the examples, they can be made intermittent.

A description of a material used for a cover in accordance with the present invention will be described hereafter. To simplify the description, a composition comprising a hydrogenated styrene and conjugated diene copolymer, a plasticizer to be used for a rubber, an olefin group resin and an additive is referred to as SEB-TPE hereinafter.

A hydrogenated styrene and conjugated diene block copolymer (referred to as SEB, hereafter) used as a component (a) of a thermoplastic elastomer constituting a cover in accordance with the present invention is obtained by hydrogenating a double bond of the conjugated diene unit of a styrene and conjugated diene block copolymer composed of at least two polymer block A including a styrene unit as a main part thereof and at least one polymer block B' including a conjugated diene unit as a main part thereof, and is expressed, for example, as A-B-A, A-B-A-B, A-B-A-B-A . . . (A-B)n-X (wherein n is an integral number between 2 and 4, X is Si, Sn or a coupling group such as a carboxylic acid diester or the like). The polymer block B expresses a polymer block hydrogenating the double bond of the conjugated diene unit of the polymer block B'.

In view of a processability, SEB having structures of A-B-A, A-B-A-B or A-B-X-B-A may be preferably used. A butadiene, an isoprene and 1,3-pentadiene can be used as the diene in the present invention, but in view of an industrial, use the butadiene and the isoprene may be preferably used.

An number-average molecular weight of SEB must be $10^5$ or more, as when the number-average molecular weight of SEB is under $10^5$, the mechanical strength is lowered and the deformation of the cover under a high temperature becomes larger. When SEB having a larger molecular weight is used, however, a viscosity of a polymer solution becomes higher and a polymerization must be conducted under a lower concentration due to a restriction of a polymerization apparatus, and results in a lower productivity of SEB. Accordingly, preferably the number-average molecular weight of SEB is between $10^5$ and $5 \times 10^5$.

A content of the styrene unit in SEB must be between 20% by weight and 40% by weight, as when the content of the styrene unit in SEB is under 20% by weight, a mechanical strength of the SEB-TPE is lowered, and when the content of the styrene unit in SEB is over 40% by weight, the modulus of elasticity of SEB is gradually lowered and the SEB becomes brittle, and thus this SEB-TPE cover cannot be used due to a scattering of broken pieces upon an opening of the cover. The content of the styrene unit in SEB is preferable between 25% by weight and 38% by weight, more preferably between 30% by weight and 37% by weight.

A hydrogen is selectively added to a double bond of the conjugated diene unit in the hydrogenating process of the styrene and conjugated diene block copolymer. In view of the resistance to light and oxidation, preferably the degree of hydrogenation is as high as possible, for example, over 80% by weight.

Also preferably a ratio between a 1.4 bound unit and a 1.2 bound unit in the conjugated diene unit is between 75 to 25 and 50 to 50, more preferably between 70 to 30 and 60 to 40 because, when the proportion of the 1.2 bound unit is increased, a crystallinity index of SEB is preferably lowered and provides a reduced brittleness, but conversely, the glass transition temperature is raised, and thus SEB-TPE becomes brittle under a lower temperature.

A weight proportion of SEB must be between 30 parts by weight and 55 parts by weight, preferably between 30 parts by weight and 52 parts by weight. When the weight proportion of SEB is under 30 parts by weight, a resistance to impact under a lower temperature is poor, and when the weight proportion of SEB is over 55 parts by weight, a mixing of a compound becomes very difficult and it is also difficult to obtain a cover by injection molding due to an inferior flow thereof.

The manufacture of SEB, which is a component (a) of a material from which a cover in accordance with the present invention is obtained, can be conducted by an known process capable of manufacturing SEB having the above-described structure, molecular weight and composition. For example SEB used in the present invention can be obtained by synthesizing a styrene and conjugated diene block copolymer in an inert organic solvent while using a catalyst such as a lithium catalyst, by a process disclosed in Japanese Examined Patent Publication (Kokoku) No. 40-23798, and then hydrogenating in the inert organic solvent, while using a hydrogenating catalyst, by a process disclosed in, for example, Japanese Examined Patent Publications (Kokoku) No. 42-8704, No. 43-6636 or U.S. Pat. Nos. 4,501,857 and 4,673,714.

A vegetable oil group plasticizer, a mineral oil group plasticizer or a synthetic plasticizer can be used as a plasticizer to be used for a rubber (referred to as a rubber type plasticizer hereinafter) which is a component (b) of a material from which a cover in accordance with the present invention can be obtained, but preferably a plasticizer capable of improving the flowability of SEB without breaking a physical cross linkage of SEB, i.e., a plasticizer with very low affinity to a polystyrene block, a strong affinity to a hydrogenated diene block, and having a lower solidification temperature is used. Namely, the use of a silicone group plasticizer, a polyisobutylene plasticizer, a paraffin group oil or the like is preferable. In particular, a paraffin group oil containing the least amount possible of an aromatic group compound and a naphthenic group compound is most preferable.

The content of the rubber type plasticizer can be optimized depending on the molecular weight of SEB, the content of a hydrogenated conjugated diene block in SEB, the content of SEB, and a processability and hardness of SEB-TPE or the like. When the content of the rubber type plasticizer is under 25 parts, SEB-TPE is hardened, and when the content of the rubber type plasticizer is over 50 parts, the flowability of an elastomer is improved, but the obtained cover becomes too soft.

Any type of an olefin group resin capable of compensating a deterioration of mechanical strength caused by using the rubber type plasticizer, and making a thermal deformation temperature of SEB-TPE obtained too high, can be used as an olefin group resin which is a component (c) of a material from which a cover in accordance with the present invention can be obtained, but in view of the thermal deformation temperature and an easy supply, a homopolypropylene is more preferable.

The content of the olefin group resin must be between 15 parts by weight and 30 parts by weight, preferably between 16 parts by weight and 28 parts by weight. When the content is under 15 parts by weight, the mechanical strength of the SEB-TPE is lowered and the cover becomes too soft. When the content is over 30 parts by weight, the SEB-TPE becomes too hard and cannot be used for the cover.

An antioxidant, a light stabilizer and a heat stabilizer are used as an additive which is a component (d) of a material from which a cover in accordance with the present invention can be obtained.

To prevent a deterioration of resin caused by heat generated when SEB, the rubber type plasticizer, and the olefin group resin are melted, mixed and milled to manufacture SEB-TPE, when injection molding SEB-TPE to manufacture the cover, and when the cover is used in the high-speed running object, and thus has an inferior reliability, it is necessary to blend the antioxidant and the heat stabilizer. Further, to prevent a deterioration of the polymer caused by sunshine irradiated through a front glass of the high-speed running object to the cover, and thus lowering the reliability of the cover, it is necessary to blend the light stabilizer.

At least one of a known agent capable of being used for a conjugated diene group rubber, a styrene group resin, and an olefin group resin can be used. For example, naphtylamines, diphenylamines, p-phenylenediamines, other amines, blended amines, quinolines, hydroquinone derivatives, monophenols, bis, tris or polyphenols, thiobisphenols, hindered phenols, phosphites, or the like are used as the antioxidant, and salicylic acid derivatives, benzophenons, benzotriazoles, the other ultra-violet absorbers, or the like are used as the light stabilizer. The content of the stabilizer may be 5% by weight or less.

If necessary, an agent preventing blocking, an external lubricant used to prevent an agglomeration of a pallet of SEB-TPE, a lubricant improving a release from a mold after injection molding, dyestuff and pigments used for coloring, a flame retarder, a filler or the like can be used as other additives.

To manufacture a cover in accordance with the present invention, first the thermoplastic elastomer is extruded and kneaded by an extruder or a kneader able to knead the components (a), (b), (c) and (d) of the thermoplastic elastomer to obtain a pellet, and then the pellet of the thermoplastic elastomer is extruded by a general-purpose injection molding machine having a simple structure and used for molding a general thermoplastic resin or a general thermoplastic elastomer. Accordingly, the cover in accordance with the present invention can be manufactured with a high productivity.

Various examples of the cover in accordance with the present invention, and comparative examples thereof, will be described hereinafter.

Before describing the examples and the comparative examples, the methods of evaluating the characteristics of SEB-TPE and the cover will be described.

Hardness

Figure 10A:
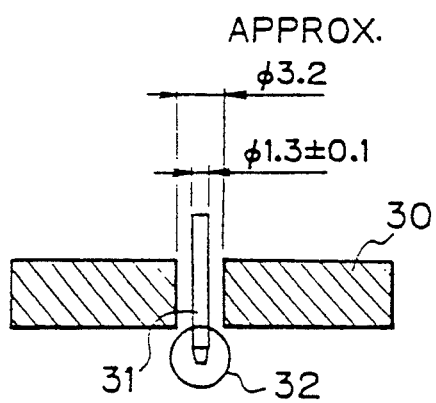
FIG. 10(A) is a front view of the needle.
Figure 10B:
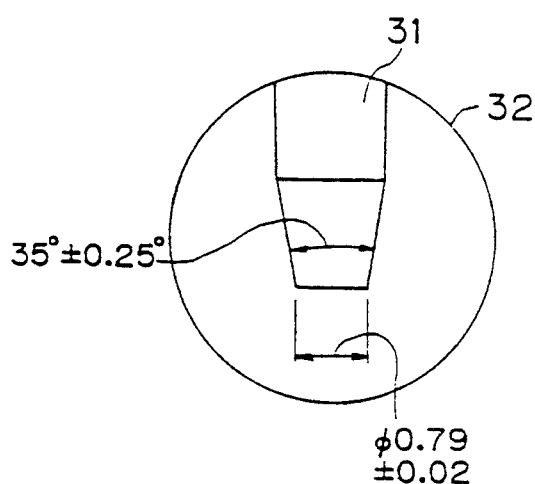
FIG. 10(B) is an enlarged view of a top of the needle.

A hardness of the cover is measured by a spring type hardness tester having an indicator 31 as shown in FIG. 10(A) according to JIS K 6310 TypeA at 23° C. The Dimensions of a top end of the indicator 31 are shown in a circle 32 in FIG. 10(B).

Bending Stiffness

A test piece is prepared from a plate manufactured by injection molding and having a size of 10 cm in length, 10 cm in width and 3 mm is thickness, and a bending stiffness is measured according to ASTM D 747-63 at 23° C. The obtained value is expressed as $kg/cm^2$.

Tensile Strength ($kg/cm^2$) and Elongation

A dumbbell No. 3 is prepared from a plate manufactured by a compression molding press, and a tensile strength and an elongation are measured by a tester having a pulling rate of 500 mm/min at 23° C. according to JIS K 6301.

Brittle Temperature

A brittle temperature is T100 (°C.) obtained by a Cold Torsion Test according to JIS K 6301.

Cover Opening Ability

An air bag having an inner volume of 60 l and a cover are fixed on a retainer of an iron. Further, an inflator capable of generating a 1 mol of gas is accommodated in the air bag, to form an air bag apparatus.

This air bag apparatus is kept in an constant temperature chamber for one hour, after the temperature of the air bag reaches a constant temperature. A temperature of the constant temperature chamber is determined at −40° C., a normal temperature or 90° C., respectively. The air bag is expanded by igniting the inflator within 1 minute after the air bag apparatus is taken out from the constant temperature chamber, to evaluate the opening characteristic of the cover.

When the cover is opened at predetermined portion, and is broken without a scattering of broken pieces of the cover, the opening characteristic of this cover is evaluated as good.

Heat Exposure of Cover

A cover is kept in a constant temperature room of 110° C. for 1000 hours.

Light Exposure of Cover

A light resistance tester using an ultraviolet carbon arc lamp according to JIS B 7751 is set in such a manner that a temperature of a black panel is determined at 83±3° C., a cover is fixed in this tester in such a manner that a surface of the cover is opposite to the lamp, and the cover is exposed to the light for 500 hours.

Example 1

The following materials are prepared and supplied to a two screw extruder.

46.0 parts by weight of SEB
Content of SEB
Number-average molecular weight: $12 \times 10^4$
Hydrogenated polybutadiene block (referred as EB, hereinafter and having degree of hydrogenation of 98.0% or more) and polystyrene block (referred as S, hereinafter) are arranged in an order of EB of 10% by weight, S of 17.5% by weight, EB of 55% by weight and S of 17.5% by weight in SEB. Weight ratio of an ethylene unit and 1-butene unit in EB is 64 to 36.

| | |
|---|---|
| Paraffin group oil having a mean molecular weight of 750 and a specific gravity of 0.877: | 33.8 part by weight |
| Homopolypropylene having MFR of 14 g/10 min and Vicat softening temperature of 152° C.: | 20.2 part by weight |
| Antioxidant of a hindered phenol group: | 0.6 part by weight |
| Heat stabilizer of a phosphite group: | 0.15 part by weight |
| Light stabilizer of a benzotriazole group: | 0.1 part by weight |
| Light stabilizer of a hindered amine group: | 0.1 part by weight |
| Carbon black: | 0.3 part by weight |

The above materials are melted, kneaded, and then extruded to make pellets of SEB-TPE. The obtained pellets are mixed with 0.2 parts by weight of a powder of a calcium stearate, to prevent an agglomeration of the pellets.

The physical properties of the obtained SEB-TPE pellets are as follows.

| | |
|---|---|
| Hardness: | 70 |
| Bending stiffness: | |
| Machine Direction | 288 kg/cm² |
| Traverse Direction | 184 kg/cm² |
| Tensile strength: | 140 kg/cm² |
| Elongation: | 870% |
| Brittle Temperature: | −60° C. or less |

Figure 1:
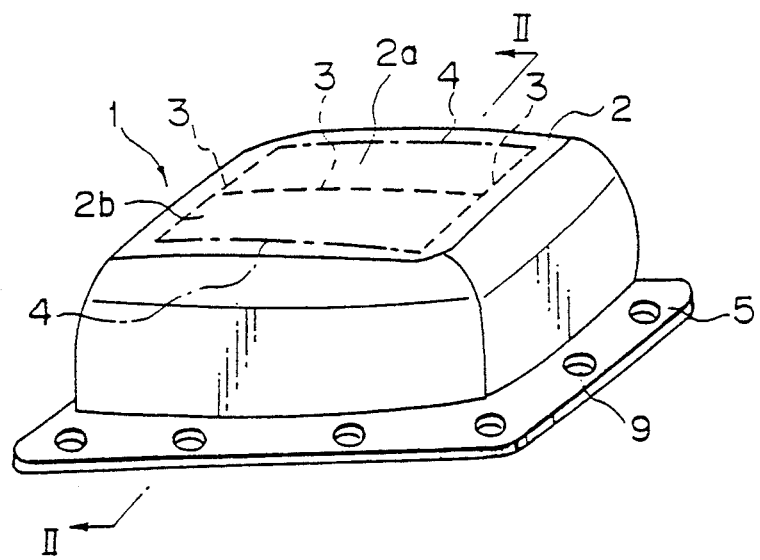
FIG. 1 is a perspective view illustrating an example of a cover of an air bag apparatus used for a driver's seat, in accordance with the present invention.

To obtain several samples of a cover of an air bag apparatus used for a driver seat and having a shape as shown in FIG. 1, SEB-TPE is supplied to an injection machine.

The injection machine having the following conditions is used to manufacture this example.

| | |
|---|---|
| Maximum press pressure: | 220 ton |
| Maximum injection pressure: | 1760 kg/cm² |
| Theorical injection volume: | 510 cm³ |
| Operation temperature in this example: | 180° C.–220° C. |

(Note this type of machine is a general purpose type injection machine)

When the cover of the example 1 is manufactured by the above injection machine, the molding cycle is 93 sec.

The tooth of an air bag apparatus assembled by using the cover of example 1 is extremely soft, and the properties of the cover e.g., opening characteristics are evaluated and the results shown in Table 1.

Example 2 and 3

SEB-TPE pellets of Examples 2 and 3 are prepared under the same conditions as that of Example 1, except that the contents of SEB, the paraffin group oil and the homopolypropylene are changed as shown in Table 1.

Several covers of the examples 2 and 3 are manufactured by the same injection machine as that of Example 1 from the above SEB-TPE, respectively, and then air bag apparatuses are assembled from those covers.

The properties of the covers and the air bag apparatuses are evaluated and the results are shown in Table 1.

Example 4

The same EB and S as used in Example 1 are prepared, but the order of EB and S in SEB is changed to S of 15% by weight, EB of 70% by weight and S of 15% by weight. A number-average molecular weight of SEB is $20.1 \times 10^4$ and a weight ratio of an ethylene unit and 1-butene unit in EB is 68 to 32.

A material composed of SEB of 39.5 parts by weight, a paraffin group oil having a mean molecular weight of 410 and a specific gravity of 0.862 of 44.2 parts by weight, the same polypropylene as that in Example 1 of 16.3 parts by weight, and the same additives as those in Example 1 and having the same quantity as those in Example 1 are uniformly blended and then supplied to a two screw extruder with a vent, to make SEB-TPE pellets.

The hardness of the obtained SEB-TPE is 63. Several covers of Example 4 are manufactured by the same injection machine as that of Example 1, from the above SEB-TPE. The molding cycle is 75 sec in Example 4. Air bag apparatuses are assembled from the above covers.

The touch of the obtained air bag apparatus is extremely good, and the opening characteristics of the cover of Example 4 conducted under temperature of −40° C., the normal temperature and 90° C. for covers not exposed to light and heat are good, and the opening characteristics of the covers of Example 4 conducted under temperatures of −40° C. and 90° C. for covers exposed to the light and for covers exposed to the heat are also good.

Example 5

A chlorinated polyolefin group primer is coated on a surface of the cover of Example 1 and is dried at a normal temperature for around 10 min, and then a flexible urethane group coating compound having DURANATE® E405 supplied from ASAHI KASEI KOGYO KABUSHIKI KAISHA as a component of NCO and an acrylic polyol A801 supplied from DAINIHON INK KAGAKU KOGYO KABUSHIKI KAISHA as a component of OH is coated on the cover and dried at 80° C. for 30 min, to be hardened to a layer on the cover. The obtained cover is kept at a room temperature for 2 days and then a surface of the cover rubbed with a gauge in which xylene is absorbed. There is no change of the appearance of the surface of the cover. When the cover of Example 1 not coated with the flexible urethane group coating compound is rubbed with the same gauge, the surface of the cover is slightly swollen, and rub marks are found on the surface of the cover.

Comparative Examples 1 to 4

SEB-TPE pellets of the Comparative Examples 1 to 4 are prepared under the same conditions as those of Example 1, except that the contents of SEP, the paraffin group oil and the homopolypropylene are changed as shown in Table 1.

Several covers of the Comparative Examples 1 to 4 are manufactured by the same injection machine as that of Example 1, from the SEB-TPE, respectively, and then air bag apparatus are assembled from those covers.

The properties of the covers and the air bag apparatuses are evaluated, and the results are shown in Table 1.

As can be seen from Table 1, the cover of Comparative example 1 has too soft a touch and an inferior shape retaining property as a cover. The cover of Comparative Example 2 has a slightly soft touch and cannot give a good feeling to a driver. The cover of Comparative Example 3 has a slightly hard touch, and when this cover is exposed to light and the opening of the exposed cover is tested, broken pieces of the cover are scattered.

Comparative Example 5 weight, an antioxidant of a hindered phenol group of 0.2 part by weight and a carbon black of 0.3 part by weight is extruded by an extruder to make a pellet of SEB-TPE.

This SEB-TPE has a hardness of 67, a tensile strength of 120 kg/cm$^2$, and an elongation of 700%.

Several covers of Comparative Example 5 are manufactured by the same injection machine as that of Example 1, from the above SEB-TPE, and when the covers of this Comparative Example are kept in an air chamber at a temperature of 110° C. the shape of the cover is remarkably deformed after one day.

Comparative Example 6

A SEB-TPE is prepared under the same conditions as those of Comparative Example 5, except that an order of EB and S in SEB is changed to EB of 10% by weight, S of 15% by weight, EB of 60% by weight, and S of 15% by weight and a numeral-average molecular weight of SEB is $4.8 \times 10^4$.

This SEB-TPE has a hardness of 84, a tensile strength of 220 kg/cm$^2$, and an elongation of 650%.

Several covers of Comparative Example 6 are manufactured by the same injection machine as that of Example 1, from the above SEB-TPE, and when the covers of this Comparative Example 6 are kept in an air box at a temperature of 110° C. shape of the covers are remarkably deformed after two days.

Comparative Example 7

A pellet is manufactured from SEB of Example 1 under the same conditions as Comparative Example 5, but SEB cannot flow properly in the extruder, and thus it is impossible to extrude SEB from the extruder.

TABLE 1

|  | Example | | | Comparative Example | | | |
| --- | --- | --- | --- | --- | --- | --- | --- |
|  | 1 | 2 | 3 | 1 | 2 | 3 | 4 |
| Content of SEB |  |  |  |  |  |  |  |
| SEB | 46.0 | 47.4 | 47.8 | 41.6 | 44.1 | 42.7 | 34.2 |
| Paraffin Group Oil | 33.8 | 36.3 | 28.3 | 47.4 | 42.1 | 25.3 | 20.2 |
| Homopolypropylene | 20.2 | 16.3 | 23.9 | 11.0 | 13.8 | 32.0 | 45.6 |
| Physical Properties of SEB-TPE |  |  |  |  |  |  |  |
| Hardness | 70 | 61 | 82 | 41 | 52 | 90 | 90 or more |
| Bending Stiffness (kg/cm$^2$) |  |  |  |  |  |  |  |
| Machine Direction | 288 | — | 490 | — | — | 905 | — |
| Traverse Direction | 184 | — | 350 | — | — | 720 | — |
| Tensile Strength (kg/cm$^2$) | 140 | 130 | 170 | 80 | 115 | 200 | — |
| Elongation (%) | 870 | 880 | 850 | 950 | 900 | 800 | — |
| Brittleness Temp. (°C.) | −60 or less | −60 or less | −60 or less | −60 or less | −60 or less | −60 or less | — |
| Touch of Air Bag Apparatus | very soft | soft | soft | inferior shape | too soft | slightly hard | too hard |
| Opening Characteristics of Cover |  |  |  |  |  |  |  |
| Without Exposure |  |  |  |  |  |  |  |
| −40° C. | good | good | good | — | — | good | — |
| Normal Temperature | good | — | good | — | — | good | — |
| 90° C. | good | good | — | — | — | good | — |
| After Heat Exposure |  |  |  |  |  |  |  |
| −40° C. | good | — | good | — | — | good | bad |
| 90° C. | good | good | — | — | — | — | — |
| After Light Exposure |  |  |  |  |  |  |  |
| −40° C. | good | — | good | — | — | bad | — |
| 90° C. | good | good | — | — | — | — | — |

The same EB and S as in Example 1 are prepared, but an order of EB and S in SEB is changed to EB of 10% by weight, S of 10% by weight, EB of 70% by weight and S of 10% by weight. A number-average molecular weight of SEB is $5.3 \times 10^4$ and a weight ratio of an ethylene unit and 1-butene unit in EB is 64 to 36.

A material composed of SEB of 100 part by weight, a heat stabilizer of a phosphite group of 0.3 part by Example 6

SEB-TPE pellet of Example 6 is prepared under the same conditions as those of Example 1, except that the content of SEB, the paraffin group oil and the homopolypropylene are changed to 52.0 parts by weight, 28.5 parts by weight and 19.5 parts by weight, respectively. This SEB-TPE has a hardness of 74, a tensile strength of 170 kg/cm² and an elongation of 880%.

Several covers of Example 6 are manufactured by the same injection machine as that of Example 1, from the above SEB-TPE. The operation temperature of the injection machine is raised to between 230° C. and 250° C., due to a lower flowability of this SEB-TPE. An air bag apparatus is assembled from the above cover, and a touch of the obtained air bag apparatus is very good, and evaluations of the opening characteristics of the cover of Example 6 under temperatures of −40° C., the normal temperature and 90° C. are conducted for covers not exposed to light and heat, and the obtained results are superior for each cover.

Example 7

The same SEB-TPE as those in Example 1 are prepared, but an order of EB and S in SEB is changed to S of 16.5% by weight, EB of 77% by weight and S of 16.5% by weight. A number-average molecular weight of SEB is $14.5 \times 10^4$ and a weight ratio of an ethylene unit and 1-butene unit in EB is 67 to 33.

A material of SEB of 33.5 parts by weight, a same paraffin group oil as that in Example 1 of 47.5 parts by weight, a same polypropylene as that in Example 1 of 19 parts by weight, and the same additive as that in Example 1 and having the same quantity as those in Example 1 is supplied to an extruder to make a pellet of SEB-TPE. This SEB-TPE has a hardness of 62, a tensile strength of 110 kg/cm², and an elongation of 800%.

Several covers of Example 7 are manufactured by the same injection machine as that of Example 1, from the above SEB-TPE, and air bag apparatuses are assembled from the above covers. The touch of the obtained air bag apparatus is good, and evaluations of the opening characteristics of the cover of Example 6 under temperatures of −40° C., the normal temperature and 90° C. are conducted for covers not exposed to light and heat, and the obtained results are superior for each cover.

Example 8

The SEB-TPE pellet of Example 8 is prepared under the same conditions as those of Example 7, except that the content of SEB, the paraffin group oil and the homopolypropylene are changed to 32.5 parts by weight, 40.0 parts by weight and 27.5 parts by weight, respectively. This SEB-TPE has a hardness of 79, a tensile strength of 140 kg/cm², and an elongation of 770%.

Several covers of Example 8 are manufactured by the same injection machine as that of Example 1, from the above SEB-TPE, and air bag apparatuses are assembled from the above covers. The touch of the obtained air bag apparatuses is extremely good, and evaluations of the opening characteristics of the cover of Example 8 under temperatures of −40° C., the normal temperature and 90° C. are conducted for covers not exposed to light and heat. The opening characteristics of the cover under the temperatures of 90° C. and the normal temperature are good, but when the cover is opened under the temperature of −40° C., cracks are generated in portions thereof other than the predetermined portions to be broken.

Comparative Example 8

The SEB-TPE pellet of Comparative Example 8 is prepared under the same conditions as those of Example 7, except that the content of SEB, the paraffin group oil, and the homopolypropylene are changed to 60.0 parts by weight, 20.0 parts by weight, and 20.0 parts by weight, respectively.

Several covers of Comparative Example 8 are manufactured by the same injection machine as that of Example 1 from the above SEB-TPE, but it is difficult to obtain a cover having a perfect shape due to an inferior flowability of this SEB-TPE.

Comparative Example 9

The SEB-TPE pellet of Comparative Example 9 is prepared under the same conditions as those of Example 1, except that the content of SEB, the paraffin group oil, and the homopolypropylene are changed to 30.0 parts by weight, 55.0 parts by weight, and 15.0 parts by weight, respectively. This SEB-TPE has a hardness of 43, a tensile strength of 100 kg/cm² and an elongation of 950%.

Several covers of Comparative Example 9 are manufactured by the same injection machine as that of the example 1, from the above SEB-TPE, and when the cover of this Comparative Example 9 is kept in an air chamber at a temperature of 110° C., a shape of the cover is remarkably deformed after one day.

Comparative Example 10

The SEB-TPE pellet of Comparative Example 10 is prepared under the same conditions as those of Example 1, except that the content of SEB, the paraffin group oil, and the homopolypropylene are changed to 25.0 parts by weight, 50.0 parts by weight, and 25 parts by weight, respectively. This SEB-TPE has a hardness of 73.

Several covers of the Comparative Example 10 are manufactured by the same injection machine as that of Example 1, from the above SEB-TPE.

An air bag apparatus is assembled from the above cover and when an air bag of the air bag apparatus is expanded at a temperature of −40° C., broken pieces of the cover are scattered.

Example 9

A cover having a shape shown in FIGS. 1 to 4 is manufactured in Examples 1 to 8 and Comparative Examples 1 to 10.

An example of a cover having a shape shown in FIGS. 5 to 7 and used for an air bag apparatus of a navigator's seat is prepared in this example.

Accordingly, an injection machine having the following conditions is used to manufacture this example.

| | |
|---|---|
| Maximum press pressure: | 315 ton |
| Maximum injection pressure: | 1640 kg/cm² |
| Theorical injection volume: | 930 cm³ |
| Operation temperature in this example: | 180° C.-220° C. |

Further, an inner volume of the air bag used in a test of the opening characteristics of the cover is changed from 60 l to 120 l, and the number of inflators is changed from 1 to 2.

The cover of Example 9 is prepared from the same SEB-TPE as that in Example 3. A molding cycle is 89 sec. The touch of an air bag apparatus assembled from the above cover is extremely soft.

The opening characteristics of the cover not exposed to light and heat is good under the temperature of −40° C., a normal temperature and 90° C., and further, the opening of covers exposed to light or heat are also good under temperatures of −40° C. and 90° C., respectively.

The features of the cover in accordance with the present invention are as follows.

1. The cover is made of a specific thermoplastic elastomer having properties, i.e., a brittleness temperature of −50° C. or less, a hardness between 60 and 85 measured according to JIS K 6301 TypeA, a thermal deformation temperature of 110° C. or more, a bending stiffness of 1000 kg/cm$^2$ or less, and a superior light and heat stability caused by adding a hydrogen to a double bond of a conjugated diene block and using a stabilizer.
2. The cover is made by an injection molding of the thermoplastic elastomer.
3. A portion having a fragile structure to be broken is provided.

Accordingly, the cover in accordance with the present invention has a long service ability and a superior soft touch, and can be safely opened at a broad range of temperatures. Further, a possibility of injury to a passenger caused by a second collision generated by a skidding of an car after a first collision is remarkably reduced.

Therefore, the cover in accordance with the present invention can be manufactured with a high productivity and a lower cost, and contributes to making the air bag apparatus lighter in weight.

Further, the cover having superior features of a surface thereof, e.g., a resistance to chemicals, can be obtained by coating the surface of the cover with a coating compound capable of being hardened by light and/or heat.

We claim:

1. A cover for accommodating an air bag in an air bag system, wherein said cover is a unitary molded body obtained by an injection molding of a thermoplastic elastomer consisting essentially of the following components (a), (b), (c) and (d) and having a hardness of between 60 and 85 measured according to JIS K 6301 TypeA, said cover having a recess for accommodating the air bag and a portion having a fragile structure to be broken when the air bag is expanded:
   (a) A hydrogenated styrene and conjugated diene block copolymer between 30% by weight and 55% by weight and obtained by hydrogenating a block copolymer composed of at least two polymer blocks including styrene units as a main part thereof, and at least one polymer block including conjugated diene units, having 1.4 bound units and 1.2 bound units in a ratio of 1.4 bound units to 1.2 bound units between 75 to 25 and 50 to 50, as a main part thereof, a content of the styrene in the copolymer being between 20% by weight and 40% by weight and an umber-average molecular weight of the copolymer being $10^5$ or more;
   (b) a plasticizer to be used for a rubber, between 25% by weight and 50% by weight; and
   (c) an olefin group resin between 15% by weight and 30% by weight;
   (d) additives including at least an antioxidant, a light stabilizer and a heat stabilizer of 5 parts by weight or less based on a total of 100 parts of components (a), (b) and (c).

2. A cover according to claim 1, wherein said conjugated diene is a butadiene.

3. A cover according to claim 1, wherein said plasticizer is a paraffin group oil.

4. A cover according to claim 1, wherein said olefin group resin is a polypropylene resin.

5. A cover according to claim 1, wherein said fragile structure is formed by providing at least an elongated recess on a portion of said cover.

6. A cover according to claim 5, wherein said elongated recess is a groove having a V-shaped cross section.

7. A cover according to claim 1, wherein a surface of said cover is covered with a layer hardened by light and/or heat.

* * * * *

UNITED STATES PATENT AND TRADEMARK OFFICE
CERTIFICATE OF CORRECTION

PATENT NO.   : 5,358,986
DATED        : October 25, 1994
INVENTOR(S)  : Norio ONOFUSA et al.

It is certified that error appears in the above-identified patent and that said Letters Patent is hereby corrected as shown below:

Claim 1, Column 16, Line 15, change "an umber" to --a number--.

Signed and Sealed this

Seventh Day of February, 1995

*Attest:*

BRUCE LEHMAN

*Attesting Officer*  *Commissioner of Patents and Trademarks*